(12) United States Patent
Mohan et al.

(10) Patent No.: US 10,239,547 B1
(45) Date of Patent: Mar. 26, 2019

(54) PICK CART

(71) Applicant: Target Brands, Inc., Minneapolis, MN (US)

(72) Inventors: Nilesh Mohan, Medina, MN (US); Brian Edgerton, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 16/057,225

(22) Filed: Aug. 7, 2018

(51) Int. Cl.
*B62B 3/00* (2006.01)
*B62B 3/14* (2006.01)
*B62B 3/02* (2006.01)

(52) U.S. Cl.
CPC ............ *B62B 3/1464* (2013.01); *B62B 3/005* (2013.01)

(58) Field of Classification Search
CPC .................................. B62B 3/005; B62B 3/02
See application file for complete search history.

(56) References Cited

U.S. PATENT DOCUMENTS

| | | | |
|---|---|---|---|
| 1,445,395 A | 2/1923 | Harvey | |
| 1,854,777 A | 4/1932 | Bales | |
| D152,249 S | 1/1949 | Fox | |
| 2,604,334 A | 7/1952 | Schultz | |
| 3,007,708 A | 11/1961 | Ochs | |
| 3,330,576 A | 7/1967 | Willis | |
| 3,536,016 A | 10/1970 | Chesley | |
| 3,589,746 A | 6/1971 | Inglis et al. | |
| 3,971,568 A | 7/1976 | Wright | |
| 4,045,043 A | 8/1977 | Fourrey | |
| 4,391,454 A | 7/1983 | Marsh et al. | |
| 5,718,441 A | 2/1998 | Kern et al. | |
| 5,839,739 A | 11/1998 | Shannon et al. | |
| 5,848,798 A | 12/1998 | Halvorson, Jr. et al. | |
| 6,173,847 B1 | 1/2001 | Zellner, III et al. | |
| 6,299,004 B1 * | 10/2001 | Thalenfeld | A47F 1/12 211/184 |
| 6,669,214 B1 | 12/2003 | Domis | |
| 7,213,816 B2 | 5/2007 | Gregory et al. | |

(Continued)

OTHER PUBLICATIONS

Walmart, "Lorell Mobile File Cart", https://www.walmart.com/ip/Lorell-Mobile-File-Cart-Champagne/395747011, at least as early as Mar. 7, 2018, 1 page.

(Continued)

*Primary Examiner* — Bryan A Evans
(74) *Attorney, Agent, or Firm* — Leanne Taveggia Farrell; Westman, Champlin & Koehler, P.A.

(57) ABSTRACT

A pick cart includes a first end, an opposing second end, a first side and an opposing second side, a plurality of shelves each defined by the first side, the second side, the first side and the second side and a plurality of wheels attached to a bottom of a lowermost shelf of the plurality of shelves. The wheels are configured to make the pick cart mobile. A first extrusion has a length and is mounted to the first side or the second side of each of the plurality of shelves. The first extrusion includes a channel that runs along an entirety of the length of the first extrusion. At least one movable divider is configured to divide each of the plurality of shelves into compartments. Each movable divider comprises at least one slider that is configured to mate with the channel in the first extrusion.

20 Claims, 13 Drawing Sheets

(56) References Cited

U.S. PATENT DOCUMENTS

| | | | |
|---|---|---|---|
| 7,320,472 B2 | 1/2008 | Gregory et al. | |
| 8,196,761 B2 | 6/2012 | Morandi | |
| 8,333,160 B2 | 12/2012 | Lin | |
| 8,739,986 B2 | 6/2014 | Preidt et al. | |
| 8,752,848 B2 | 6/2014 | Petrick et al. | |
| 8,770,600 B2 | 7/2014 | Preidt et al. | |
| 9,192,252 B2* | 11/2015 | Lindblom | A47F 5/137 |
| 9,643,635 B2 | 5/2017 | Allen | |
| 9,655,448 B2 | 5/2017 | Tiilikainen et al. | |
| 9,737,141 B2 | 8/2017 | Johnson | |
| D806,977 S | 1/2018 | Green et al. | |
| 2005/0146103 A1 | 7/2005 | Lampe | |
| 2008/0086971 A1* | 4/2008 | Liao | A47B 31/00 52/592.1 |
| 2015/0076779 A1* | 3/2015 | Lindblom | A47F 5/137 280/47.35 |
| 2017/0197647 A1* | 7/2017 | Bouma | A47B 57/38 |
| 2018/0057033 A1 | 3/2018 | Green et al. | |

OTHER PUBLICATIONS

Two Bit Circus Foundation, "Steam Carts", http://twobitcircus.org/our-programs/steam-carts/, at least as early as Apr. 30, 2018, 1 page.

Gamut, "Tool Utility Cart", https://www.gamut.com/p/tool-utility-cart-steel-31-in-overall-ht-30-in-overall-wd-ODQ5MTA2?utm_source=google&utm_medium=cpc&adpos=3o28&scid=scplp857X985&sc_intid=857X985&gclid=EAlalQobChMlt_yxrZvJ2QIVRVgNCh3waAMiEAkYHCABEgKZ0PD_BwE, at least as early as Apr. 30, 2018, 1 page.

Mass Medical Storage, "Mid-Size ERCP Cart", http://www.massmedicalstorage.com/medical-storage-carts/, at least as early as Apr. 30, 2018, 1 page.

Photo of Target e-commerce cart, at least as early as Apr. 30, 2018, 1 page.

Photo of Target inventory cart, at least as early as Mar. 7, 2018, 1 page.

Photo of a free standing file organizer by "Eldon Office Products", at least as early as Jul. 2018, 1 page.

* cited by examiner

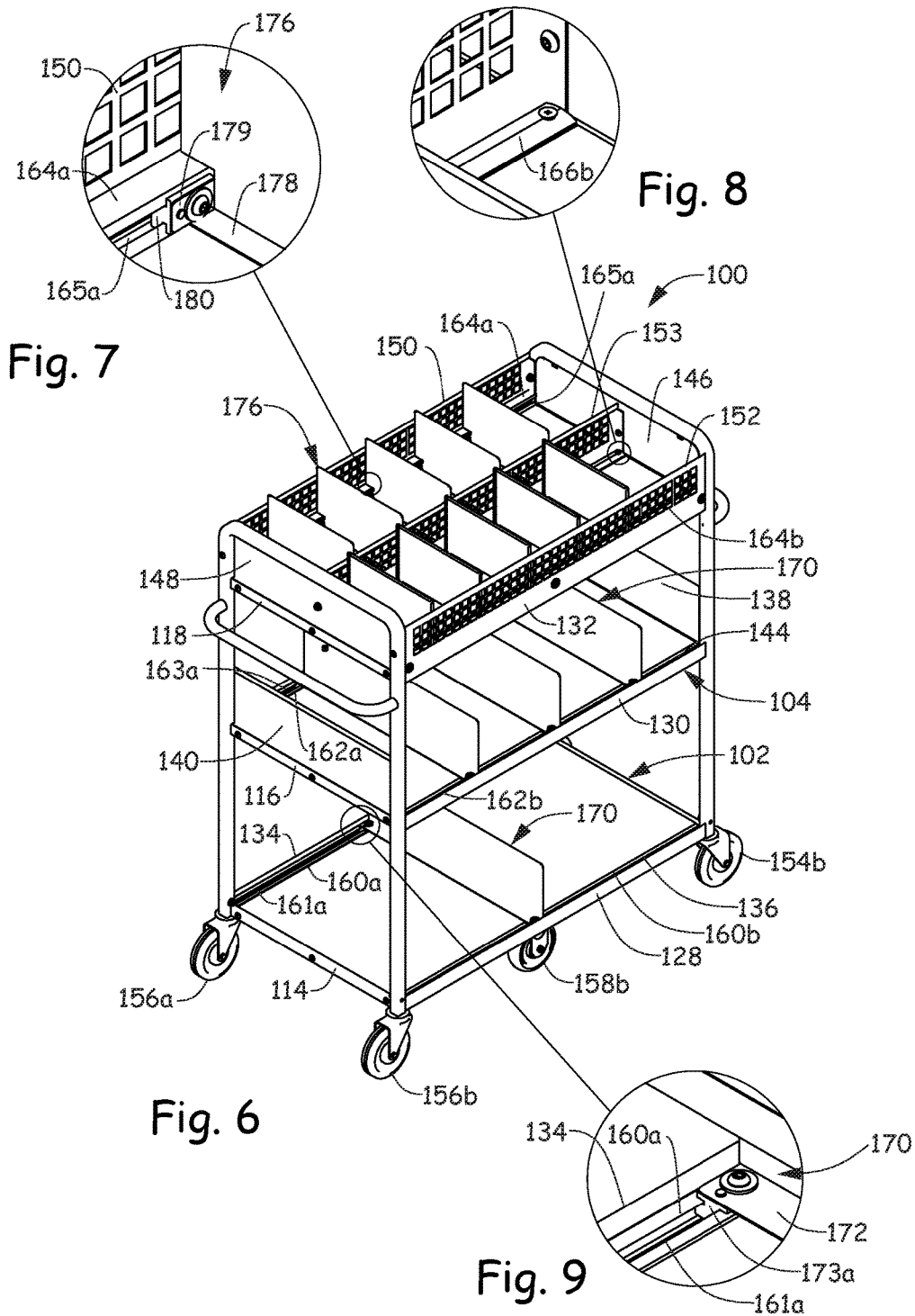

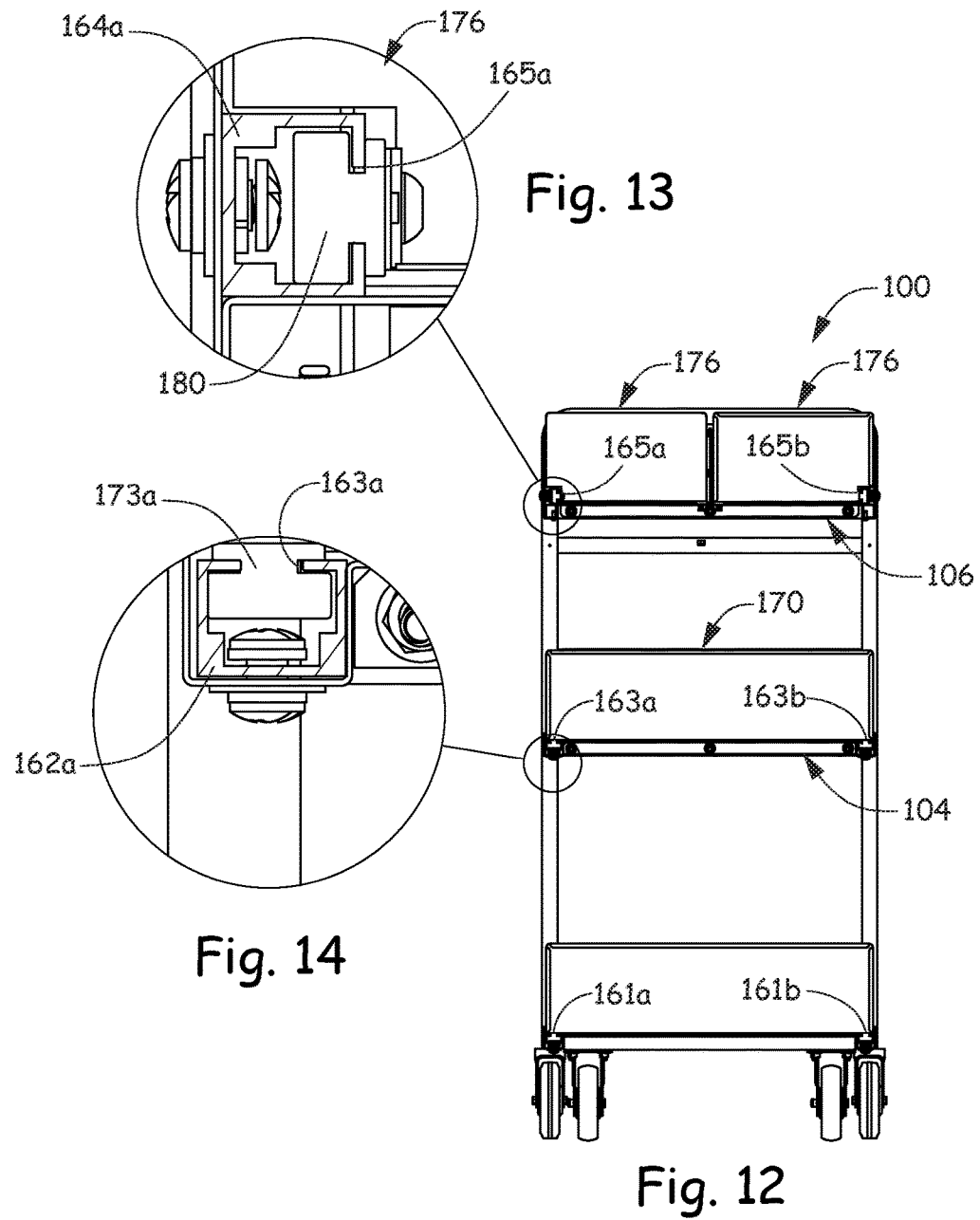

PICK CART

BACKGROUND

Pick carts are used by team members or employees of a retailer to gather items for order fulfillment. More specifically, pick carts are used to transfer merchandise from a display area on a retail store floor or an area in a distribution center to a pack station for order fulfillment.

The discussion above is merely provided for general background information and is not intended to be used as an aid in determining the scope of the claimed subject matter.

SUMMARY

A pick cart includes a first end, an opposing second end, a first side and an opposing second side. The pick cart also includes a plurality of shelves that are each defined by the first and second ends and the first and second sides. A plurality of wheels are attached to a bottom of a lowermost shelf of the plurality of shelves and are configured to make the pick cart mobile. An extrusion has a length and is mounted to the first side or the second side of each of the plurality of shelves. The extrusion includes a channel that runs along an entirety of the length of the extrusion. At least one movable divider is configured to divide each of the plurality of shelves into compartments. Each movable divider comprises at least one slider that is configured to mate with and slide within the channel in the first extrusion.

A pick cart includes at least one shelf, at least one movable divider configured to divide the at least one shelf into compartments, an extrusion and a blocker. The at least one divider includes a slider coupled to a main body of the at least one movable divider. The extrusion is mounted to the at least one shelf and includes a free end, an opposing obstructed end and a channel that runs an entire length of the extrusion. The extrusion is fixed along a portion of an edge of the at least one shelf. The obstructed end of the extrusion is located adjacent to the first or second ends of the at least one shelf. The blocker is located on the at least one shelf adjacent to the free end of the extrusion and is configured to be removed from the free end of the extrusion when the at least one slider coupled to the at least one movable divider is being removed from or is being inserted into the channel in the extrusion.

A method is provided for removing or inserting a movable divider configured to divide a shelf of a pick cart into compartments. A blocker located on the shelf adjacent to a free end of a first extrusion is removed. The first extrusion extends along a first side or a second side of the shelf and includes a channel that runs along an entirety of the length of the first extrusion. Inserting or removing the movable divider into a position includes sliding a slider coupled to a body of the movable divider into or out of the channel of the first extrusion. The blocker is then replaced so that it is located adjacent to the free end of the extrusion.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 6 is another top perspective view of the pick cart of FIG. 1.
FIG. 7 is an enlarged perspective view of a portion of FIG. 6.
FIG. 8 is an enlarged perspective view of a portion of FIG. 6.
FIG. 9 is an enlarged perspective view of a portion of FIG. 6.
FIG. 12 is a section view of the pick cart of FIG. 1 as indicated by the section line in FIG. 3.
FIG. 13 is an enlarged section view of a portion of FIG. 12.
FIG. 14 is an enlarged section view of a portion of FIG. 12.

DETAILED DESCRIPTION

Picking items for multiple different retail orders, placing the items on a pick cart, sorting items to the correct retail order and moving them to a prep and/or pack station to complete order fulfillment presents challenges. Such challenges include ensuring there is space on the pick cart for transporting large and bulky items as well as small items, ensuring the storage areas are easy to fill and easy to access, ensuring the items do not fall off during transport and that various ergonomics factors are designed to be safe and efficient. Embodiments described below include a pick cart that has a modular divider system where the size and shape of storage areas are changeable without great effort.

Figure 1:
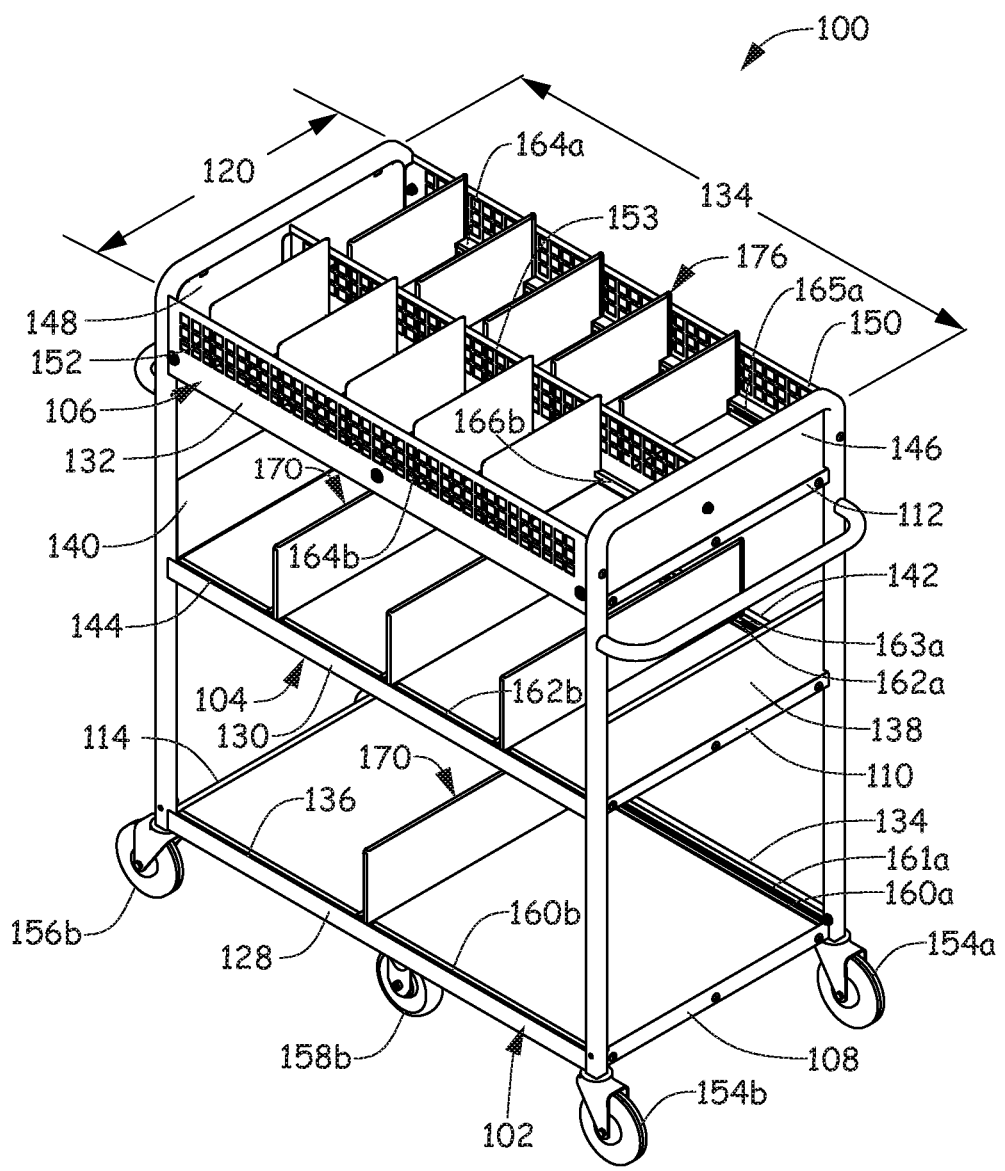
FIG. 1 is a top perspective view of a pick cart according to an embodiment.
Figure 2:
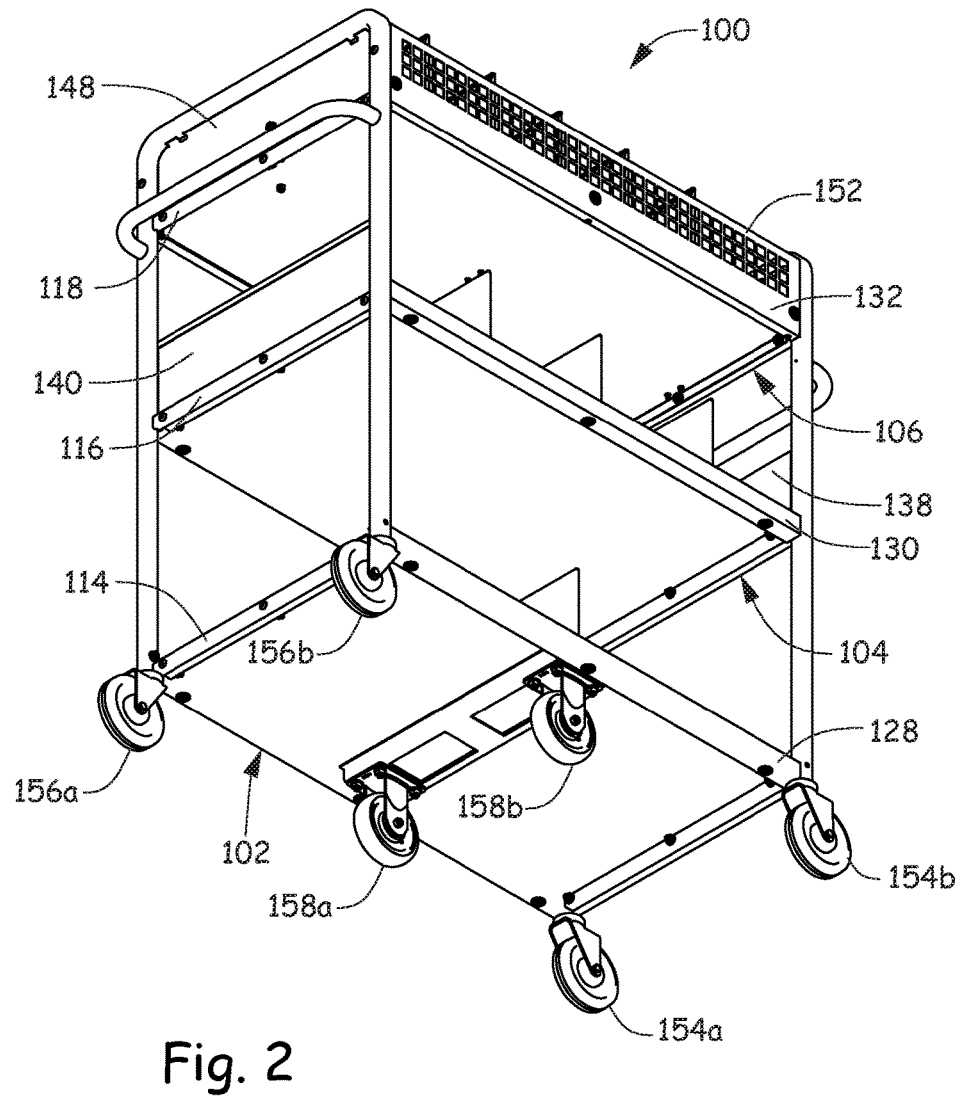
FIG. 2 is a bottom perspective view of FIG. 1.
Figure 3:
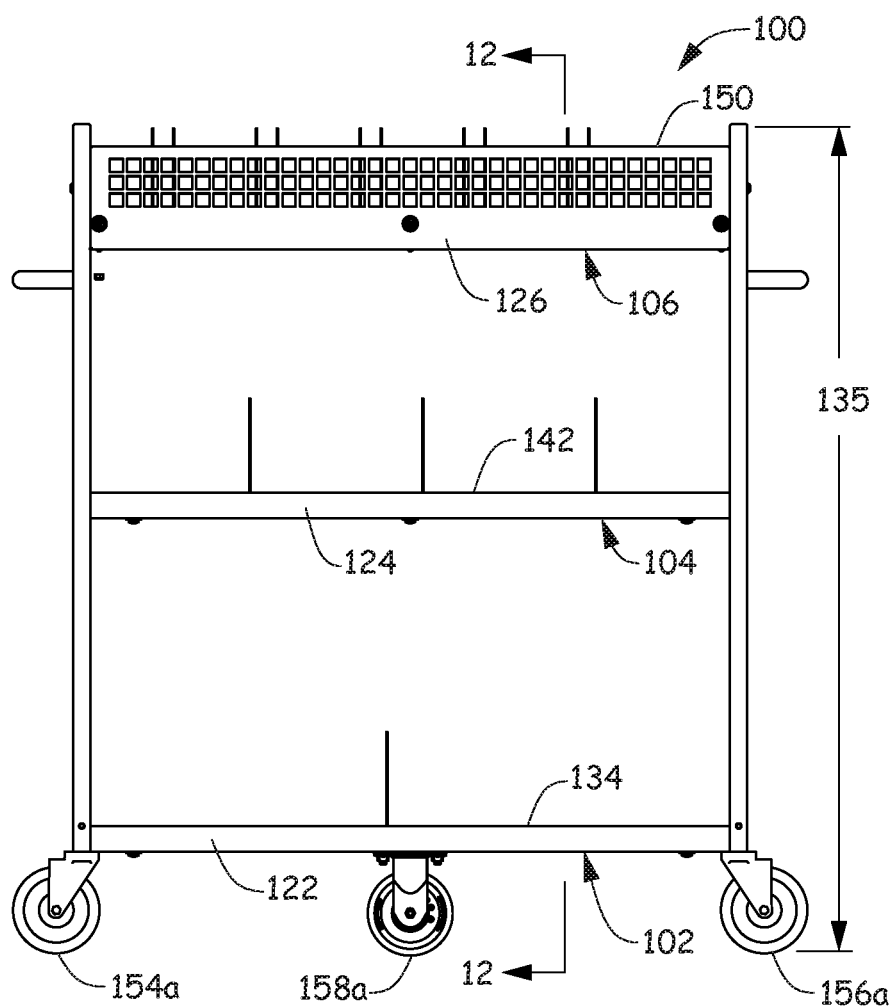
FIG. 3 is right side view of FIG. 1.
Figure 4:
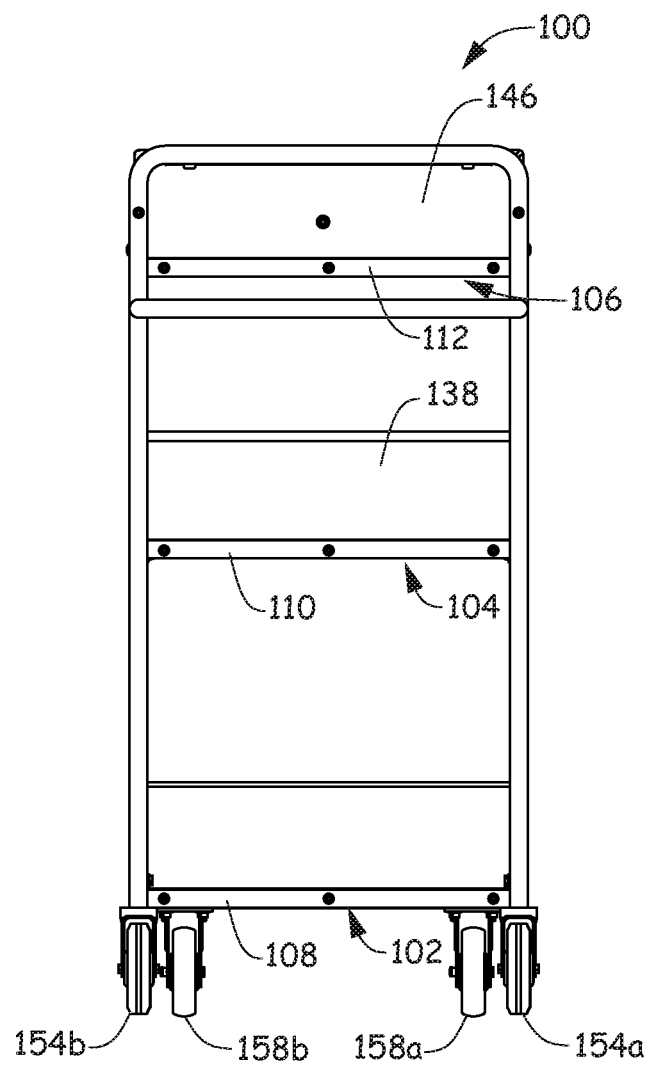
FIG. 4 is a front view of FIG. 1.
Figure 5:
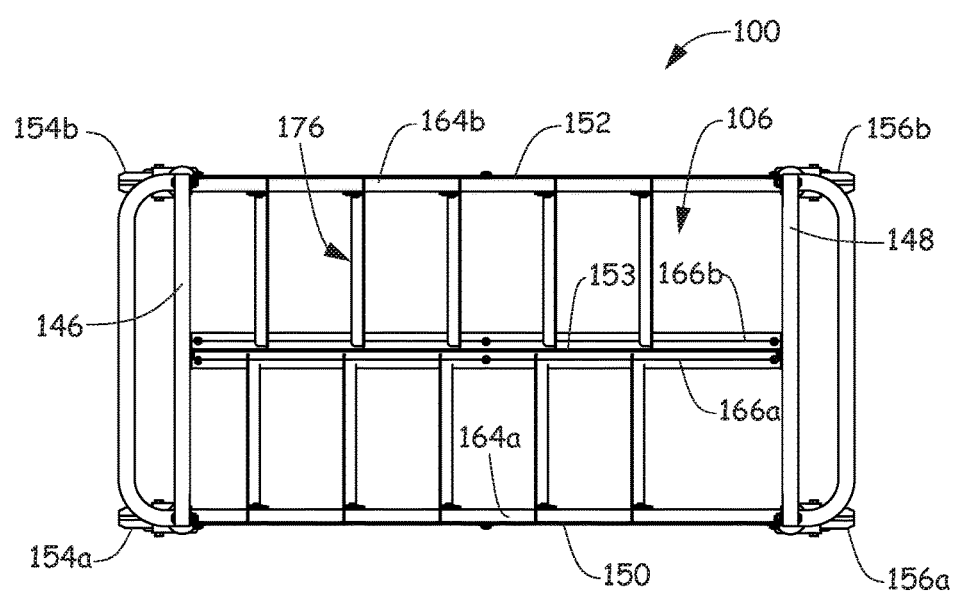
FIG. 5 is a top view of FIG. 1.

FIG. 1 is a top perspective view of a pick cart 100 according to an embodiment. FIG. 2 is a bottom perspective view, FIG. 3 is right side view (the left side view being identical), FIG. 4 is a front view (the back view being identical) and FIG. 5 is a top view of FIG. 1. Pick cart 100 includes a first end as depicted in FIG. 4, a second end, a first side as depicted in FIG. 3 and a second side. The first and second ends extend widthwise on pick cart 100 and have a width 120. The first and second sides extend lengthwise on pick cart 100 and have a length 134. As illustrated, pick cart 100 includes a plurality of shelves: a bottom or lowermost shelf 102, a middle shelf 104 and a top or uppermost shelf 106. It should be realized that any number of shelves are possible Each shelf 102, 104 and 106 is defined by the first end, the second end, the first side and the second side of pick cart 100 and each shelf 102, 104 and 106 includes first ends 108, 110 and 112, respectively, and opposing second ends 114, 116 and 118, respectively. Each shelf 102, 104 and 106 is also defined by first sides 122, 124 and 126, respectively, and opposing second sides 128, 130 and 132. Pick cart 100 also has a height 135 (FIG. 3) that is optimized for ergonomics. In particular, it positions top or uppermost shelf 106 at a level where a person of average height need not lift items above their shoulders or lower items below their waist.

In one embodiment, bottom or lowermost shelf 102 is an open shelf having no walls at any of first or second ends 108 and 114 and a lip 134 and 136 at each of first and second sides 122 and 128. This type of open shelf is best for holding larger, bulkier items of merchandise that are less likely to fall off pick cart 100 due to their larger weight and ease of access. For example, bottom shelf 102 may have a load capacity of 200 lbs. Middle shelf 104 is a partially open shelf having first and second walls 138 and 140 at respective first end 110 and second end 116 and a lip 142 and 144 at each of first and second sides 124 and 130. This type of partially open shelf is best for medium sized items of merchandise that may fall off pick cart 100 at first end 110 and second end 116, but less likely to fall off at first side 124 or second side 130. For example, middle shelf 104 may have a loading capacity of 150 lbs. Top or uppermost shelf 106 is an enclosed shelf having first and second walls 146 and 148 at respective first and second ends 112 and 118 as well as first and second side walls 150 and 152 that extend from first wall 146 to second wall 148 at first and second sides 126 and 132 of pick cart 100 and a center wall 153 that also extends from first wall 146 to second wall 148. While first and second walls 146 and 148 are solid walls like first and second walls 138 and 140 of middle shelf 104, first and second side walls 150 and 152 and center wall 153 comprise a lattice so that the items of merchandise that are placed on top shelf 106 are more visible. This type of enclosed shelf is best for small sized items of merchandise that would otherwise easily fall off pick cart 100 at first end 112, second end 118, first side 126 and second side 132. For example, top shelf 108 may have a loading capacity of 150 lbs.

Pick cart 100 further includes a plurality of wheels attached to a bottom of bottom shelf 102 and are configured to make pick cart 100 mobile. In the embodiment illustrated in FIGS. 1-5, the plurality of wheels includes a pair of first wheels 154a and 154b, a pair of second wheels 156a and 156b and a pair of center wheels 158a and 158b. First wheels 154a and 154b are located at each corner of first end 108 of bottom shelf 102 and in one embodiment are swivel caster wheels. Second wheels 156a and 156b are located at each corner of second end 114 of bottom shelf 102 and in one embodiment are swivel caster wheels. Center wheels 158a and 158b are located on the bottom of the center of bottom shelf 102 and in one embodiment are rigid caster wheels.

Each shelf 102, 104 and 106 includes at least one extrusion having a length and being mounted to the first side or the second side of each shelf. The at least one extrusion includes a channel that runs along an entirety of the length of the extrusion. In one embodiment, bottom shelf 102 includes first and second extrusions 160a and 160b where first extrusion 160a is positioned along first side 122 and adjacent to lip 134. The opening of its channel 161a faces upwardly relative to bottom shelf 102. Second extrusion 160b is positioned along second side 128 and adjacent to lip 136. The opening of its channel 161b (FIG. 12) faces upwardly relative to bottom shelf 102. FIG. 6 is another top perspective view of pick cart 100, FIG. 7 is an enlarged perspective view of a portion of FIG. 6, FIG. 8 is an enlarged perspective view of a portion of FIG. 6 and FIG. 9 is an enlarged perspective view of a portion of FIG. 6. In FIG. 9, the enlarged perspective view is of a portion of pick cart 100 that illustrates a portion of extrusion 160a having upwardly facing channel 161a and being positioned next to lip 136.

In one embodiment, middle shelf 104 includes first and second extrusions 162a and 162b where first extrusion 162a is positioned along first side 124 and adjacent to lip 142. The opening of its channel 163a faces upwardly relative to middle shelf 104. Second extrusion 162b is positioned along second side 130 and adjacent to lip 144. The opening of its channel 163b (FIG. 12) faces upwardly relative to middle shelf 104. First and second extrusions 162a and 162b are similar to first and second extrusions 160a and 160b in that each are located on opposing sides of the shelf from each other and have channels all facing in the same direction.

Top shelf 106 includes first and second extrusions 164a and 164b where first extrusion 164a is positioned along first side 124 and adjacent to first wall 150. The opening of its channel 165a faces inwardly toward the center of top shelf 106. Second extrusion 164b is positioned along second side 130 and adjacent to second wall 152. The opening of its channel 163b (FIG. 12) faces inwardly toward the center of top shelf 106. First and second extrusions 164a and 164b are similar to first and second extrusions 160a and 160b and 162a and 162b in that each are located on opposing sides of the shelf from each other. However, first and second extrusions 164a and 164b are dissimilar in that channels 165a and 165b face inwardly toward each other rather than face upwardly as do channels 161a and 161b and channels 163a and 163b. Top shelf 106 further includes first and second wear strips 166a and 166b mounted to a top of top shelf 106 along either side of center wall 153. Second wear strip 166b is illustrated in more detail in FIG. 8.

Figure 10:
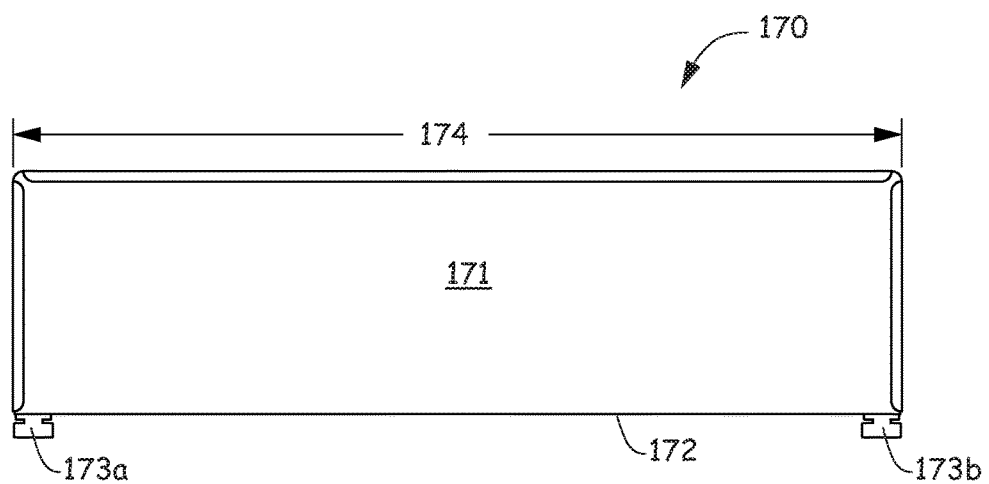
FIG. 10 is a front view of a divider configured for use with a lower shelf of the pick cart of FIG. 1.
Figure 11:
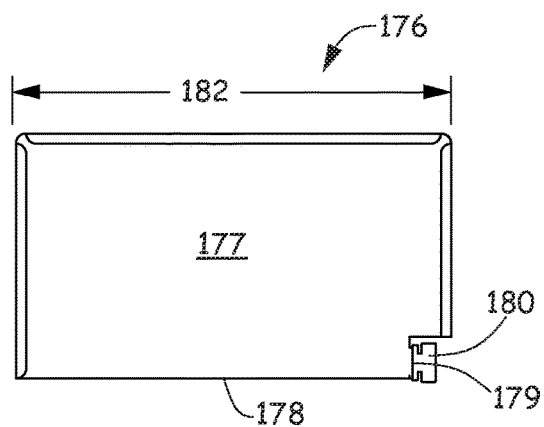
FIG. 11 is a front view of a divider configured for use with a upper shelf of the pick cart of FIG. 1.

As illustrated in FIGS. 1-6, pick cart 100 includes a plurality of movable dividers. FIG. 10 is a front view of a movable divider 170 configured to divide bottom shelf 102 and middle shelf 104 of pick cart 100 into compartments. FIG. 11 is a front view of a movable divider 176 configured to divide top shelf 106 of pick cart 100 into compartments. Movable dividers 170 and 176 each include at least one slider that is configured to mate with the channel of the at least one extrusion. The at least one slider moves along the channel in either of two opposing directions to adjust and define the compartment sizes for each shelf. In addition, movable dividers 170 and 176 may be added or removed as needed to create compartments. Adding or removing movable dividers 170 and 176 will be discussed in detail below.

In one embodiment, movable divider 170 includes a main body 171 having a hemmed top edge and hemmed first and second side edges. A return flange 172, as better illustrated in FIG. 9, is located at a bottom of main body 171 and attached to return flange 172 are a pair of first and second sliders 173a and 173b. First and second sliders 173a and 173b are mounted to a bottom of return flange 172 and at either of the sides of moveable divider 170. First slider 173a is configured to mate with and slide within channel 161a of extrusion 160a, channel 161b of extrusion 160b, channel 163a of extrusion 162a or channel 163b of extrusion 162b, respectively, and second slider 173b is configured to mate with and slide within channel 161b of extrusion 160b, channel 161a of extrusion 160a, channel 162b of extrusion 162b or channel 163a of extrusion 162a. This allows one or more movable dividers 170 to be movable on any of bottom shelf 102 or middle shelf 104 and to be inserted into either channels of those shelves. For example, first and second sliders 173a and 173b may be made of an ultra-high-molecular weight polyethylene (UHMW PE), which allows them to have high impact strength, a low coefficient of friction (to easily slide) and resistance to abrasion. Other examples of first and second sliders 173a and 173b include making them more frictionless, such as using ball bearings.

In addition, a width 174 of divider 170 is substantially the same as a width 120 of bottom shelf 102 and middle shelf 104.

In one embodiment, movable divider 176 includes a main body 177 having a top edge, a hemmed first edge, a hemmed second edge and a return flange 178 located on a bottom of main body 177. A portion of the second edge of main body 177 is notched out and folded into a side flange 179 as best illustrated in FIG. 7. Movable divider 176 includes a single slider 180 that is mounted to side flange 179. Slider 180 is configured to mate with and slide within channel 165a of extrusion 164a or channel 165b of extrusion 164b. In other words, movable divider 180 has one side that mates with a channel and an opposing side that is free. The free side moves along first wear strip 166a or second wear strip 166b. This allows one or more movable dividers to be located between center wall 153 and first side wall 150 and located between center wall 153 and second side wall 152. Between center wall 153 and first side wall 150, movable dividers 176 have fronts that face frontward on pick cart 100 and sliders 180 that slide in channel 165a that faces inwardly toward center wall 153 from right sidewall 150, and between center wall 153 and second side wall 152, movable dividers 176 have fronts that face backward on pick cart 100 and sliders 180 that slide in channel 165b that faces inwardly toward center wall 153 from left side wall 152. As discussed above, sliders 180 may be made of an ultra-high-molecular weight polyethylene (UHMW PE), which allows for the sliders to have high impact strength, a low coefficient of friction and resistant to abrasion. Other examples for sliders include making them more frictionless, such as using ball bearings. In addition, a width 182 of divider 176 is substantially the same as a distance between center wall 153 and first side wall 150 and center wall 153 and second side wall 152.

FIG. 12 is a section view of pick cart 100 as indicated by the section line in FIG. 3. FIG. 13 is an enlarged section view of a portion of FIG. 12, and FIG. 14 is an enlarged section view of a portion of FIG. 12. In FIG. 13, first extrusion 164a is illustrated as holding slider 180 of divider 176 for top shelf 106. In FIG. 14, first extrusion 162a is illustrated as holding slider 173a of divider 170 for middle shelf 104. In other words, first extrusion 164a is the same as first extrusion 162a, however, first extrusion 164a is mounted vertically on top shelf 106 so that channel 165a is facing inwardly and first extrusion 162a is mounted horizontally on middle shelf 104 so that channel 163a is facing upwardly. First extrusion 160a on bottom shelf 102 is also mounted horizontally so that channel 161a is facing upwardly.

Figure 15:
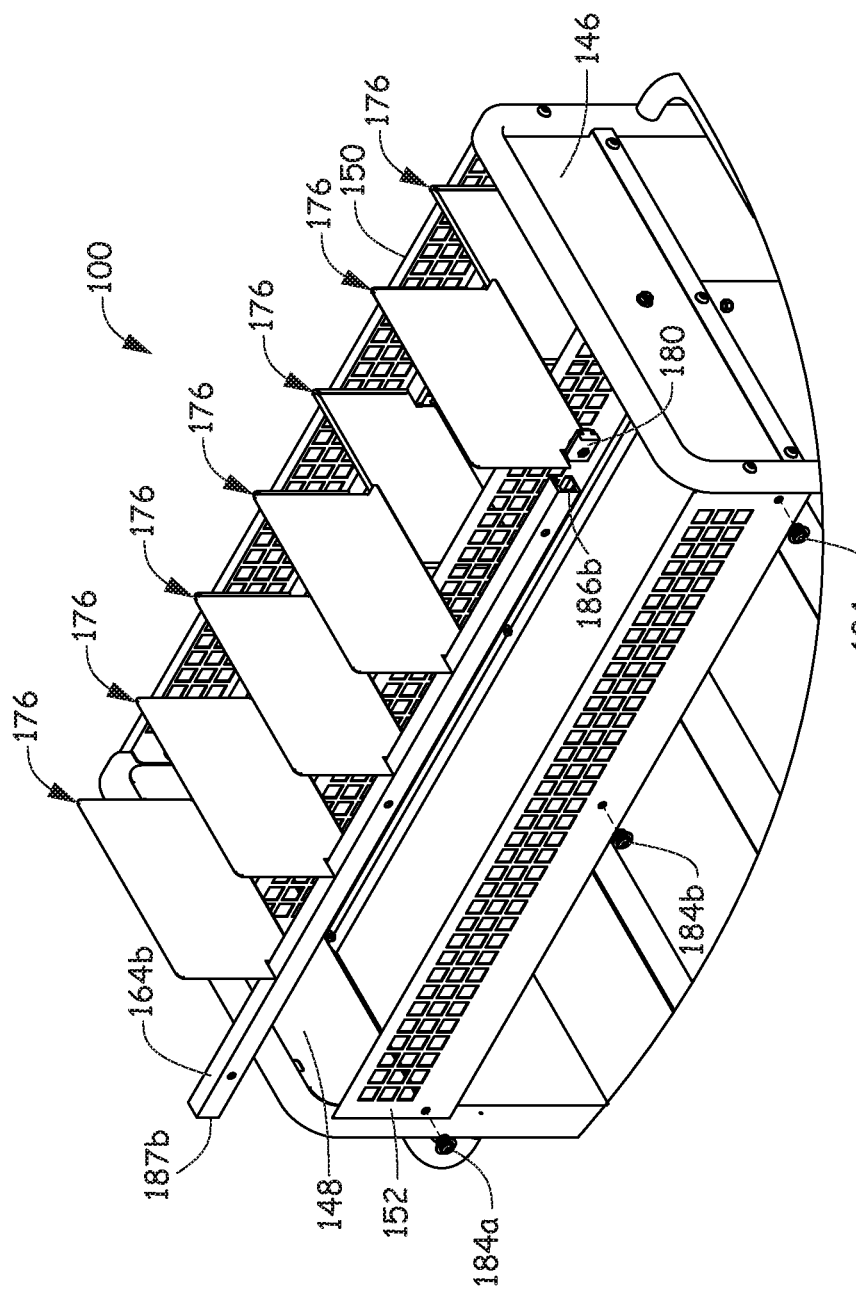
FIG. 15 is an exploded perspective view of a portion of FIG. 1.

FIG. 15 is an exploded perspective view of a portion of FIG. 1 and illustrates the process of removing, inserting or replacing movable dividers. While FIG. 15 specifically illustrates the removal, insertion or replacement of movable dividers 176, the same process may be used for the removal, insertion or replacement of movable dividers 170. In FIG. 15, hardware that attaches second extrusion 164b to top shelf 106 is removed. As illustrated in the FIG. 15 embodiment, hardware includes fasteners 184a, 184b and 184c which attach the length of second extrusion 164b to top shelf 106 through second side wall 152. Second extrusion 164b includes a first end 186b and a second end 187b. When second extrusion 164b is mounted to top shelf 106, first end 186b is flush with first end 146 and second end 187b is flush with second end 148. Next, second extrusion 164b is lifted up and sliders 180 of movable dividers 176 are slid out of channel 165b at either first or second ends 186b or 187b of extrusion 164b to remove or replace movable dividers 176.

To insert movable dividers 176, the process is reversed and sliders 180 of movable dividers 176 are slid into channel 165b at first or second ends 186b and 187b of extrusion 164b to insert movable dividers 176. Extrusion 164b is then remounted to top shelf 106 using fasteners 184a, 184b and 184c. It should be realized that the described method is in the context of extrusion 164b, however, this same process may be used for all of the extrusions located on pick cart 100 including extrusion 164a, 162b, 162a, 160b and 160a except that fasteners for mounting extrusions 160a, 160b, 162a and 162b are applied through the bottoms of shelves 102 and 104.

Figures 16, 17:
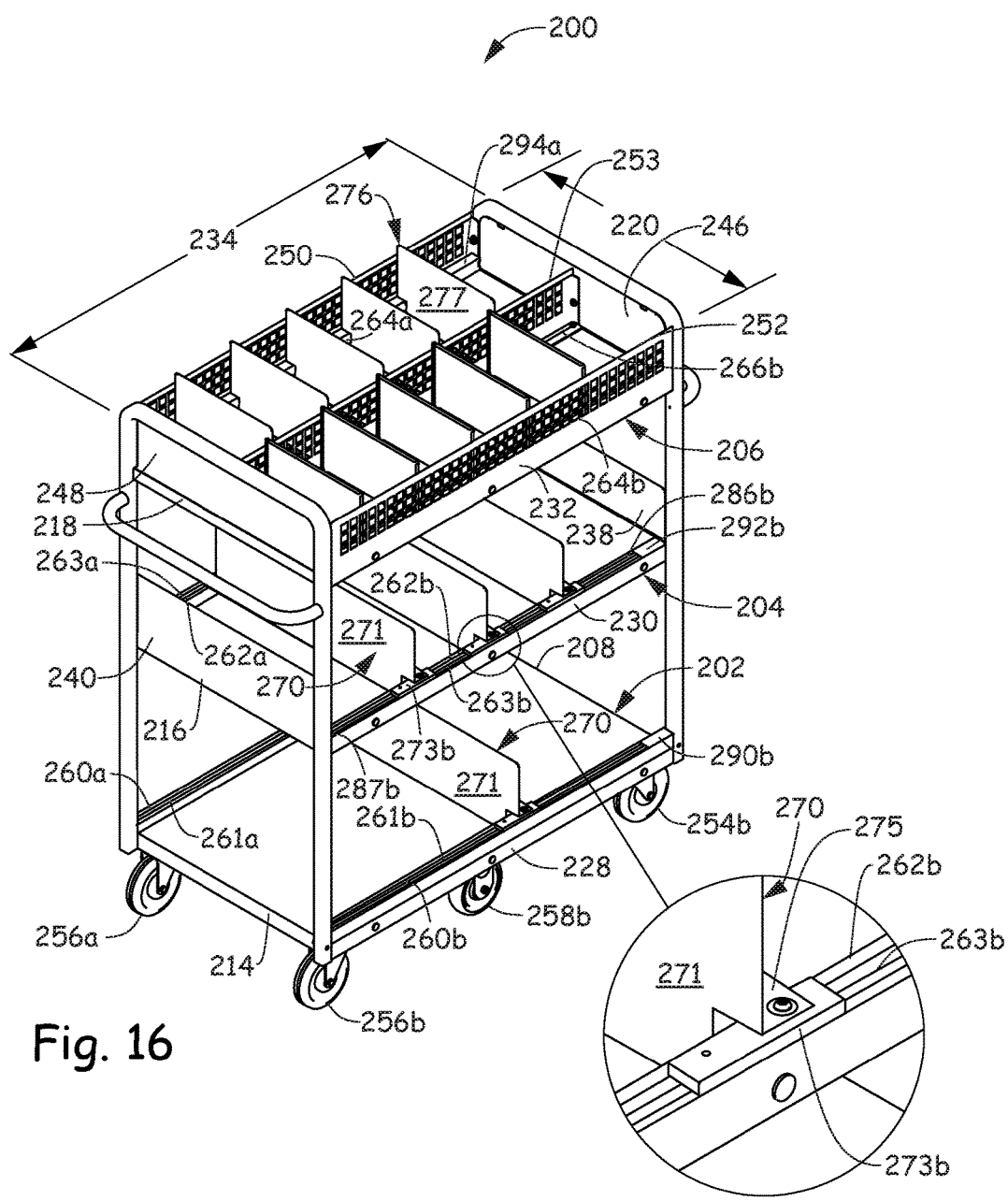
FIG. 16 is a top perspective view of a pick cart according to another embodiment.
FIG. 17 is an enlarged perspective view of a portion of FIG. 16.
Figure 18:
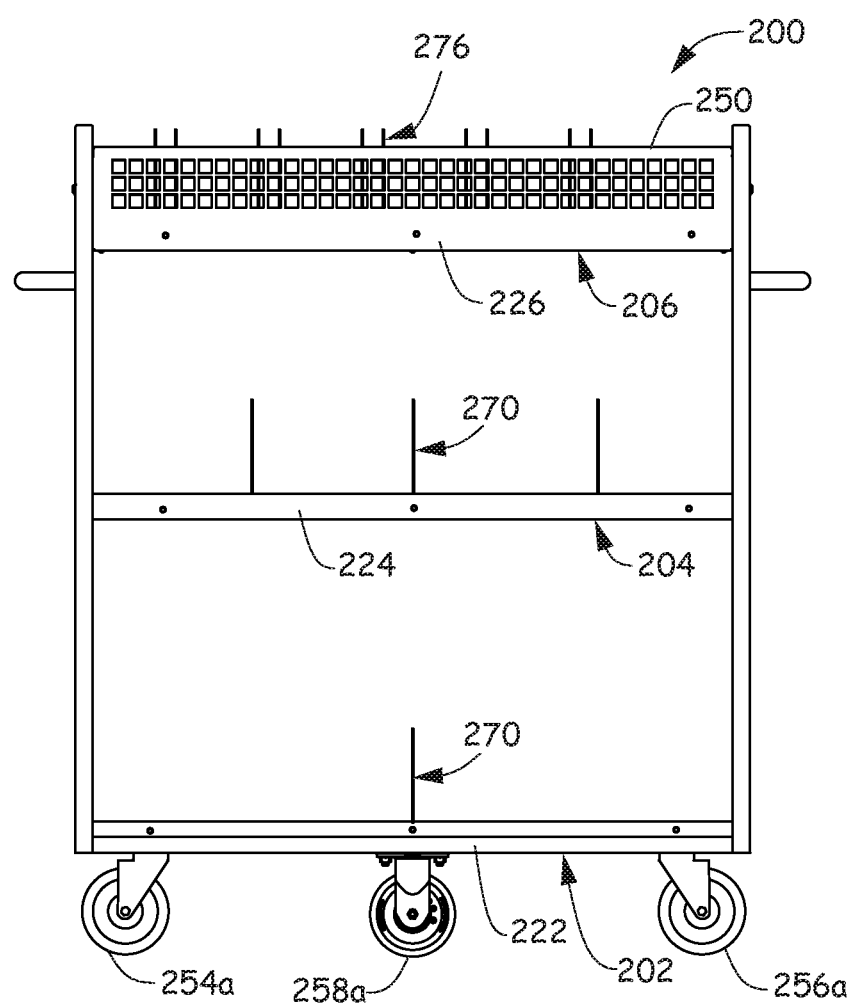
FIG. 18 is a right side view of FIG. 16.
Figure 19:
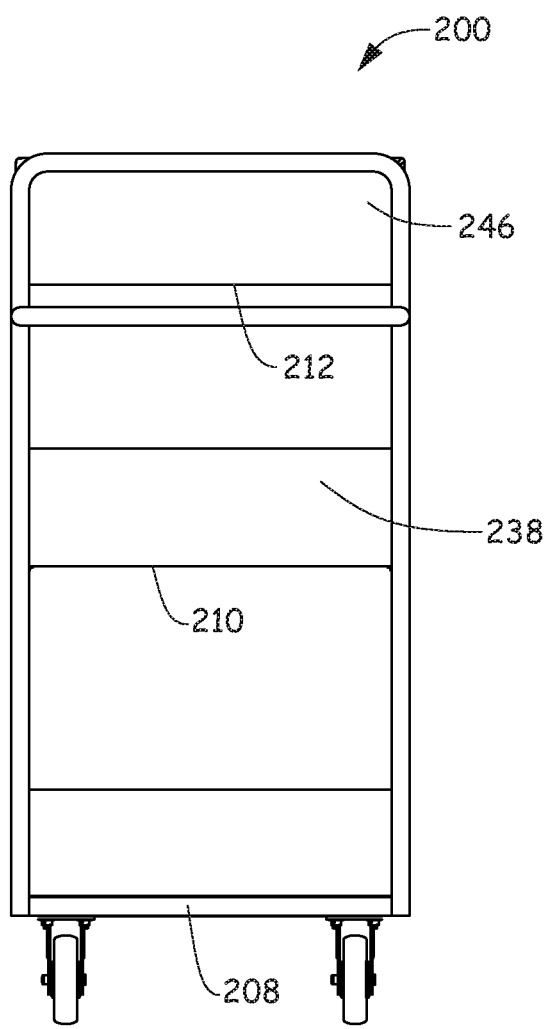
FIG. 19 is a front view of FIG. 16.
Figure 20:
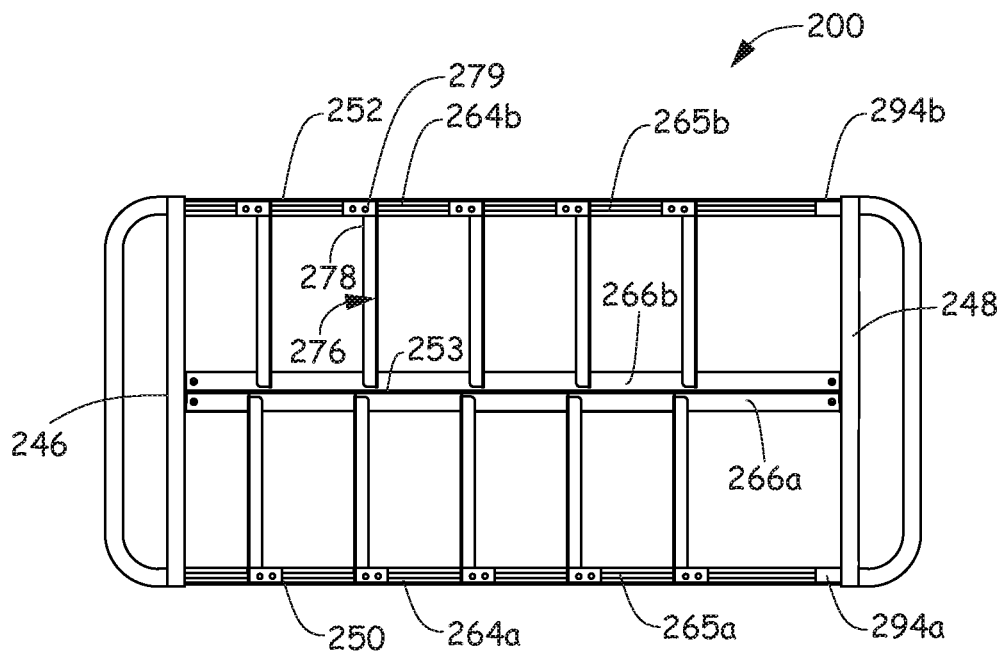
FIG. 20 is a top view of FIG. 16
Figure 21:
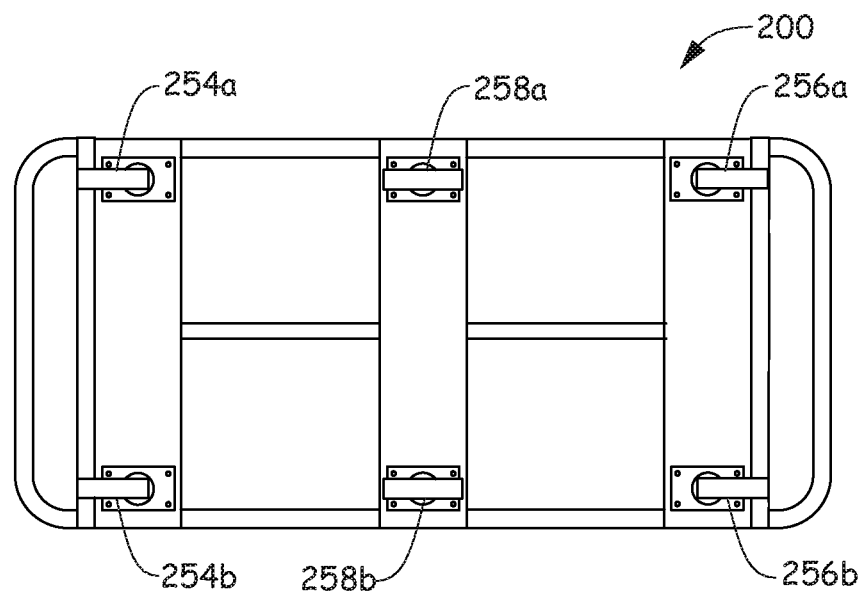
FIG. 21 is a bottom view of FIG. 16.

FIG. 16 is a top perspective view of a pick cart 200 according to another embodiment. FIG. 18 is a right side view (the left side view being identical), FIG. 19 is front view (the back view being identical), FIG. 20 is a top view and FIG. 21 is a bottom view. Pick cart 200 includes a first end as depicted in FIG. 19, a second end, a first side as depicted in FIG. 18 and a second side. The first and second ends extend widthwise on pick cart 200 and have a width 220. The first and second sides extend lengthwise on pick cart 200 and have a length 234. As illustrated, pick cart 200 includes a plurality of shelves: a bottom or lowermost shelf 202, a middle shelf 204 and a top or uppermost shelf 206. It should be realized that any number of shelves are possible. Each shelf 202, 204 and 206 is defined by the first end, the second end, the first side and the second side of pick cart 200 and each shelf 202, 204 and 206 includes first ends 208, 210 and 212, respectively, and opposing second ends 214, 216 and 218, respectively. Each shelf 202, 204 and 206 is defined by first sides 222, 224 and 226, respectively, and opposing second sides 228, 230 and 232.

In one embodiment, bottom or lowermost shelf 202 is an open shelf having no walls at any of first or second ends 208 and 214. This type of open shelf is best for holding larger, bulkier items of merchandise that are less likely to fall off pick cart 200 due to their larger weight and ease of access. For example, bottom shelf 202 may have a load capacity of 200 lbs. Middle shelf 204 is a partially open shelf having first and second walls 238 and 240 at respective first end 210 and second end 216. This type of partially open shelf is best for medium sized items of merchandise that may fall off pick cart 200 at first end 210 and second end 216, but less likely to fall off at first side 224 or second side 230. For example, middle shelf 204 may have a loading capacity of 150 lbs. Top or uppermost shelf 206 is an enclosed shelf having first and second walls 246 and 248 at respective first and second ends 212 and 218 as well as first and second walls 250 and 252 that extend from first wall 246 to second wall 248 at first and second sides 226 and 232 of pick cart 200 and a center wall 253 that also extends from first wall 246 to second wall 248. While first and second walls 246 and 248 are solid walls like first and second walls 238 and 240 of middle shelf 204, first and second side walls 250 and 252 and center wall 253 comprise a lattice so that the items of merchandise that are placed on top shelf 206 are more visible. This type of enclosed shelf is best for small sized items of merchandise that would otherwise easily fall off pick cart 200 at first end 212, second end 218, first side 226 and second side 232. For example, top shelf 206 may have a loading capacity of 150 lbs.

Pick cart 200 further includes a plurality of wheels attached to a bottom of bottom shelf 202 and are configured to make pick cart 200 mobile. In the embodiment illustrated in FIGS. 16 and 18-21, the plurality of wheels includes a pair of first wheels 254a and 254b, a pair of second wheels 256a and 256b and a pair of center wheels 258a and 258b. First wheels 254*a* and 254*b* are located at each corner of first end 208 of bottom shelf 202 and in one embodiment are swivel caster wheels. Second wheels 256*a* and 256*b* are located at each corner of second end 214 of bottom shelf 202 and in one embodiment are swivel caster wheels. Center wheels 258*a* and 258*b* are located on the bottom of the center of bottom shelf 202 and in one embodiment are rigid caster wheels.

Each shelf 202, 204 and 206 includes at least one extrusion having a length and being mounted to the first side or the second side of each shelf. The at least one extrusion includes a channel that runs along an entirety of the length of the extrusion. Bottom shelf 202 includes first and second extrusions 260*a* and 260*b* where first extrusion 260*a* is positioned along first side 222 and the opening of its channel 261*a* is facing upwardly relative to bottom shelf 202. Second extrusion 260*b* is positioned along second side 228 and the opening of its channel 261*b* is facing upwardly relative to bottom shelf 202. FIG. 17 is an enlarged perspective view of a portion of FIG. 16.

Middle shelf 204 includes first and second extrusions 262*a* and 262*b* where first extrusion 262*a* is positioned along first side 224 and the opening of its channel 263*a* is facing upwardly relative to middle shelf 204. Second extrusion 262*b* is positioned along second side 230 and the opening of its channel 263*b* is facing upwardly relative to middle shelf 204. First and second extrusions 262*a* and 262*b* are similar to first and second extrusions 260*a* and 260*b* in that each are located on opposing sides of the shelf from each other and have channels facing in the same direction. In FIG. 17, the enlarged perspective view is of a portion of pick cart 200 that illustrates a portion of second extrusion 262*b* having upwardly facing channel 263*b*.

Top shelf 206 includes first and second extrusions 264*a* and 264*b* where first extrusion 264*a* is positioned along first side 226, adjacent to wall 250 and the opening of its channel 265*a* is facing upwardly. Second extrusion 264*b* is positioned along second side 232, adjacent to wall 252 and the opening of its channel 265*b* is facing upwardly. First and second extrusions 264*a* and 264*b* are similar to first and second extrusions 260*a* and 260*b* and 262*a* and 262*b* in that each are located on opposing sides of the shelf from each other and have channels facing upwardly. Top shelf 206 further includes first and second wear strips 266*a* and 266*b* located along either side of center wall 253.

As illustrated in FIGS. 16-20 pick cart 200 includes a plurality of movable dividers 270 and 276. Movable dividers 270 and 276 each include at least one slider that is configured to mate with the channel of the at least one extrusion. The at least one slider moves along the channel in either of two opposing directions to adjust and define the compartment sizes for each shelf. In addition, movable dividers 270 and 276 may be added or removed as needed to create compartments. Adding or removing movable dividers 270 and 276 will be discussed in detail below.

In one embodiment, movable divider 270 includes a main body 271 having a return flange (not shown) located at a bottom of main body 271 and a portion of the first and second edges of main body 271 are notched out and folded into side flanges 275 as best illustrated in FIG. 17. Attached to each side flange 275 is a first slider (not illustrated) or a second slider 273*b*. The first slider and second slider 273*b* are mounted at either of side flanges 275 of movable divider 270. The first slider and second slider 273*b* are configured to mate with and slide within channel 261*a* of first extrusion 260*a* or channel 261*b* of second extrusion 260*b*, respectively, or within channel 263*a* of first extrusion 262*a* or channel 263*b* of second extrusion 262*b*. This allows one or more movable dividers 270 to be movable on any of bottom shelf 202 or middle shelf 204.

In one embodiment, movable divider 276 includes a main body 277 having a top edge and a return flange 278 (FIG. 20) located on a bottom of main body 277. A portion of one edge of main body 277 is notched out and folded into a side flange 279 (FIG. 20). Movable divider 276 includes a single slider (hidden from view) that is mounted to an under side of side flange 279. The slider is configured to mate with and slide within channel 265*a* of first extrusion 264*a* or channel 265*b* of second extrusion 264*b*. In other words, movable divider 276 has one side that mates with a channel and an opposing side that is free. The free side moves along wear first strip 266*a* or second wear strip 266*b*. This allows one or more dividers to be located between center wall 253 and right side wall 250 and between center wall 253 and left side wall 252. Between center wall 253 and first side wall 250, movable dividers 276 have fronts that face frontward on pick cart 200 and sliders 280 that slide in channel 265*a* that faces upwardly and between center wall 253 and second side wall 252, movable dividers 276 have fronts that face backward on pick cart 200 and sliders 280 that slide in channel 265*b* that faces upwardly.

In the embodiment illustrated in FIGS. 16-21, the process of removing, inserting or replacing dividers 270 and 276 is different than removing, inserting or replacing dividers 170 and 176 in the embodiment illustrated in FIGS. 1-15. In the embodiment illustrated in FIGS. 16-21, each extrusion includes a free end (such as free end 286*b* of extrusion 262*b*) and an obstructed end (such as obstructed end 287*b* of extrusion 262*b*). The obstructed end of each extrusion is located adjacent to the second end of the shelf (such as obstructed end 287*b* of extrusion 262*b* being located adjacent to second wall 240 of middle shelf 204). Wedged adjacent to the free end (such as free end 286*b* of extrusion 262*b*) includes a removable blocker that in one embodiment comprises a foam block. In particular, bottom shelf 202 includes a blocker (hidden from view) located between first end 208 and a free end of extrusion 260*a* and a blocker 290*b* located between first end 208 and a free end of extrusion 260*b*. Middle shelf 204 includes a blocker (hidden from view) located between first wall 238 and a free end of extrusion 262*a* and a blocker 292*b* located between first wall 238 and a free end of extrusion 262*b*. Top shelf 206 includes a blocker 294*a* located between first wall 246 and a free end of extrusion 264*a* and a blocker 294*b* located between first wall 246 and a free end of extrusion 264*b*.

To remove, insert or replace movable dividers 270, both blockers located at the free end of each extrusion are removed from bottom and middle shelves 202 and 204. Next, sliders attached to each movable divider 270 are slid out of channel 261*a* and 261*b* or 263*a* or 263*b* at the first ends of respective extrusions 260*a* and 260*b* and 262*a* and 262*b*. To insert movable dividers 270, the process is reversed and sliders attached to each movable divider 270 are slid into the channels. To remove, insert or replace movable dividers 276 in top shelf 206, only one of the blockers 294*a* and 294*b* needs to be removed at a time. Otherwise the process is similar.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A pick cart comprising:
a first end, an opposing second end, a first side and an opposing second side;
a plurality of shelves that are each defined by the first and second ends and the first and second sides;
a plurality of wheels attached to a bottom of a lowermost shelf of the plurality of shelves and are configured to make the pick cart mobile;
a first extrusion having a length and being mounted to the first side or the second side of each of the plurality of shelves, the first extrusion including a channel that runs along an entirety of the length of the first extrusion; and
at least one movable divider configured to divide each of the plurality of shelves into compartments, each movable divider comprising at least one slider that is configured to mate with and slide within the channel in the first extrusion.

2. The pick cart of claim 1, further comprising a second extrusion having a length and being mounted to the other of the first side or the second side of each of the plurality of shelves from the first extrusion and including a channel that runs along an entirety of the length of the second extrusion.

3. The pick cart of claim 2, wherein the at least one movable divider that is configured to divide each of the plurality of shelves comprises movable dividers having a single slider and movable dividers having first and second sliders, wherein the movable dividers having the single slider are configured to mate with the channel in the first extrusion or the channel in the second extrusion and wherein the movable dividers with first and second sliders are configured to mate with the channel in the first extrusion and with the channel in the second extrusion.

4. The pick cart of claim 1, wherein the channel in the first extrusion faces upwardly relative to the shelf on which it is mounted.

5. The pick cart of claim 1, wherein the channel in the first extrusion faces inwardly toward a center of each shelf on to which it is mounted.

6. The pick cart of claim 1, wherein the first extrusion includes a free end and an obstructed end, wherein the obstructed end is located adjacent to the first end or the second end of each of the plurality of shelves.

7. The pick cart of claim 6, further comprising a removable blocker located adjacent to the free end of the first extrusion and when removed is configured to allow movable dividers to be inserted into the channel in the first extrusion and when in place is configured to prevent movable dividers in the channel in the first extrusion from being removed.

8. The pick cart of claim 1, wherein an uppermost shelf of the pick cart includes a first side wall, a second side wall and a center wall, wherein each of the first side wall, second side wall and center wall comprise a lattice.

9. The pick cart of claim 1, wherein the movable dividers on the uppermost shelf are located between the center wall and the first side wall or the center wall and the second side wall.

10. A pick cart comprising:
at least one shelf;
at least one movable divider configured to divide the at least one shelf into compartments, wherein the at least one divider includes a slider coupled to a main body of the at least one movable divider;
a first extrusion mounted to the at least one shelf and including a free end, an opposing obstructed end and a channel that runs an entire length of the extrusion, wherein the first extrusion is fixed along a portion of an edge of the at least one shelf and the obstructed end is located adjacent first or second ends of the at least one shelf; and
a blocker configured to be located on the at least one shelf and adjacent to the free end of the first extrusion and configured to be removed from the free end of the first extrusion when the at least one slider that is coupled to the at least one movable divider is being removed from or is being inserted into the channel in the first extrusion.

11. The pick cart of claim 10, further comprising a second extrusion mounted to another of an edge of the at least one shelf and including a channel that runs along an entire length of the second extrusion.

12. The pick cart of claim 11, wherein the at least one movable divider comprises movable dividers having a single slider and movable dividers having first and second sliders, wherein the movable dividers with the single slider are configured to mate with the channel in the first extrusion or the channel in the second extrusion on one of the shelves and wherein the movable dividers with the first and second sliders are configured to mate with the channel in the first extrusion and mate with the channel in the second extrusion.

13. The pick cart of claim 10, wherein the channel in the first extrusion faces upwardly relative to the shelf on which it is mounted.

14. The pick cart of claim 10, wherein an uppermost shelf of the pick cart includes a first side wall, a second side wall and a center wall, each of the first side wall, the second side wall and the center wall comprise a lattice.

15. The pick cart of claim 14, wherein the at least one movable divider on the uppermost shelf is located between the center wall and the first side wall or the center wall and the second side wall.

16. The pick cart of claim 10, wherein the blocker comprises a foam block.

17. A method of removing or inserting a movable divider configured to divide a shelf of a pick cart into compartments, the method comprising:
removing a blocker located on the shelf adjacent to a free end of a first extrusion, the first extrusion extending along a first side or a second side of the shelf and including a channel that runs along an entirety of the length of the first extrusion;
inserting or removing the movable divider into a position including sliding a slider coupled to a body of the movable divider into or out of the channel of the first extrusion; and
returning the blocker so that it is located adjacent to the free end of the first extrusion.

18. The method of claim 16, wherein the movable divider comprises a single slider coupled to the body of the movable divider and wherein inserting or removing the movable divider comprises sliding the single slider into or out of the channel in the first extrusion.

19. The method of claim 16, further comprising removing a second blocker located between on the shelf adjacent to a free end of a second extrusion, the second extrusion extending along the other of the first side or the second side of the shelf from the first extrusion and including a channel that runs along an entire length of the second extrusion.

20. The method of claim 19, wherein the movable divider comprise first and second sliders coupled to the body of the movable divider and wherein inserting or removing the movable divider comprises sliding the first slider into and out of the channel in the first extrusion and sliding the second slider into and out of the channel in the second extrusion.

* * * * *